United States Patent [19]

Warkotsch

[11] Patent Number: 4,768,909
[45] Date of Patent: Sep. 6, 1988

[54] HIGH-SPEED LOCK NUT, ESPECIALLY FOR ATTACHING A VEHICLE WHEEL TO THE CLAMPING SHAFT OF A BALANCING MACHINE

[76] Inventor: Horst Warkotsch, Schulze-Delitzsch-Str. 21, Fed. Rep. of Germany

[21] Appl. No.: 16,546

[22] Filed: Feb. 19, 1987

[30] Foreign Application Priority Data

Feb. 22, 1986 [DE] Fed. Rep. of Germany ....... 3605821

[51] Int. Cl.⁴ .............................................. F16B 37/10
[52] U.S. Cl. .................................... 411/433; 411/437; 411/432; 157/20
[58] Field of Search ............... 411/432, 433, 436, 437, 411/409, 347, 349, 350; 269/173, 174; 157/14, 20

[56] References Cited

U.S. PATENT DOCUMENTS

| | | | |
|---|---|---|---|
| 1,879,421 | 9/1932 | Nalle | 411/433 X |
| 2,736,227 | 2/1956 | Stroble | 411/433 |
| 2,793,376 | 5/1957 | Pavlinetz | 411/409 X |
| 4,058,242 | 11/1977 | Brewer | 411/409 X |
| 4,332,169 | 6/1982 | Stuart | 411/433 X |
| 4,531,872 | 7/1985 | Warkotsch | 411/433 |

FOREIGN PATENT DOCUMENTS

| | | | |
|---|---|---|---|
| 480511 | 5/1953 | Italy | 411/433 |
| 30851 | 3/1965 | Japan | 411/433 |
| 30852/70 | 6/1965 | Japan | 411/433 |

Primary Examiner—Gary L. Smith
Assistant Examiner—Curtis B. Brueske
Attorney, Agent, or Firm—Allegretti & Witcoff, Ltd.

[57] ABSTRACT

A high-speed lock nut, especially for attaching a vehicle wheel to the clamping shift of a balancing machine, has a casing or body in which at least one threaded segment is positioned in a radially movable manner. Manually actuating means serve to move the segment radially. The actuating means engage with the segment by means of a radially-acting connecting link guide comprising pins on the segments and cooperating oblique slots in a coaxial disk. By means of the connecting link guide, the segment can be activated easily and securely, even under high contact pressures, for example, with contaminated threads. Furthermore, the thread segment is automatically locked in closed position against the threaded shaft of the balancing machine by the connecting link guide. The construction is very simple.

3 Claims, 1 Drawing Sheet

HIGH-SPEED LOCK NUT, ESPECIALLY FOR ATTACHING A VEHICLE WHEEL TO THE CLAMPING SHAFT OF A BALANCING MACHINE

BACKGROUND OF THE INVENTION

The invention relates to a high-speed lock nut, especially for attaching a vehicle wheel to the clamping shaft of a balancing machine. The nut contains radially movable threaded segments to permit disengaging the threads of the nut from the threads of the clamping shaft to move the nut quickly up the shaft into contact with the vehicle wheel. Thereafter, the segments automatically close to engage the threads and the nut is tightened to final locking position.

Prior Art

From German specification No. 31 27 521, a high-speed lock nut of the type stated is known, which has two threaded semi-circular segments, which are prestressed, positioned rotatably in a body, and are radially movable. The threaded segments are each pivotable around an axis of rotation which is parallel to the clamping shaft, which axes are positioned in two adjacent ends of the threaded segments. In the locked condition, rollers are located in an annular gap between the threaded segments and the casing of the nut. The threaded segments are prestressed by a spring in the closed direction. A wedge-shaped pressure plate serves to loosen the high-speed lock nut. This pressure plate can be moved into the aperture between the free ends of the threaded segments, which are thus spread during the actuation of the pressure plate. The pressure plate thereby ensures at the same time the final locking of the rolls, through specially formed lateral activation surfaces for the rolls.

This known high-speed lock nut has the disadvantage that, because of the limited radial expansion of the high-speed lock nut, the actuation path of the wedge-shaped pressure plate is limited, and the actuating forces are consequently very great. Through this, it frequently happens in practice that the threaded segments are not completely opened, so that they do not disengage the corresponding external threads, thus damaging or even destroying the threads of the threaded segments. If the contact pressure on the threaded segments is reduced, in order to facilitate the external engaging or external bracing of the threaded segments, then the danger is increased that the threaded segments will not close and be locked, if there is dirt in the thread courses.

SUMMARY OF INVENTION

The object of the invention is to avoid these disadvantages of the previously known high-speed lock nuts, and to provide a high-speed lock nut simple in construction, which can be easily and securely actuated even under high contact pressures on the threaded segments, by which the threaded segments are locked in closed position.

According to the invention, the actuation of the threaded segments is performed by a connecting means or link guide, which acts radially, moving in essentially a circumferential direction, in which direction a longer actuating path is available as compared with the prior art. The slant of the link is made very slight, so that the actuating forces are correspondingly reduced. Furthermore, the connecting link guide also makes possible the self-locking of the threaded segments, thus serving a dual function.

In one form of the invention the actuating means comprises a rotable disk positioned coaxially to the high-speed lock nut. A slot in the disk serves as the connecting link and engages with a pin projecting axially through the slot from the segment. By rotating the disk relative to the body of the lock nut, for example, by means of a radial arm on the disk, the threaded segment will move as directed by the slant of the slot with slight activating force. Biasing means on the connecting link guide will cause it to act simultaneously in a self-locking manner. The prestressing of the segments, and especially the actuating means, in this case the disk, is suitably carried out by means of a spring normally to urge the segments into closed position. In this way, the actuating means needs only to be actuated in one direction. When the spring engages the actuating means with even slight spring force, a locking of the segments on the clamping shaft arises from the transmission of forces through the connecting link guide.

In another modification the threaded segment has, on the outside, a connecting link guide which is oblique in the direction of circumference, and is prestressed outwardly in the radial direction. In such a case, a projection or peg creating the connecting linkage can extend into a space between the connecting surface of the segment and a cylindrical internal surface of the casing of the high-speed lock nut, so that the peg is supported in the radial direction, and can thus be very short. Through this there arises a very slight radial extension of the high-speed lock nut.

The threaded segments can be moved at right angles to the axis of the nut, and, for this purpose, the segments have two parallel lateral surfaces, and axial frontal surfaces parallel to one another, which act in harmony with corresponding guide surfaces in or on the casing of the high-speed lock nut.

In another form of the invention means for guiding the segment or the segments consists of mounting the segment for rotation on one free end of an arm, the swivel axis of which is parallel to the axis of the lock nut. Such a rotational guide requires, of course, a slightly longer movement path of the segment because of its angular movement; but the technical execution is particularly simple and inexpensive.

BRIEF DESCRIPTION OF DRAWINGS

The invention will now be illustrated in greater detail in conjunction with the drawings, in which.

PREFERRED EMBODIMENTS

Figure 1:
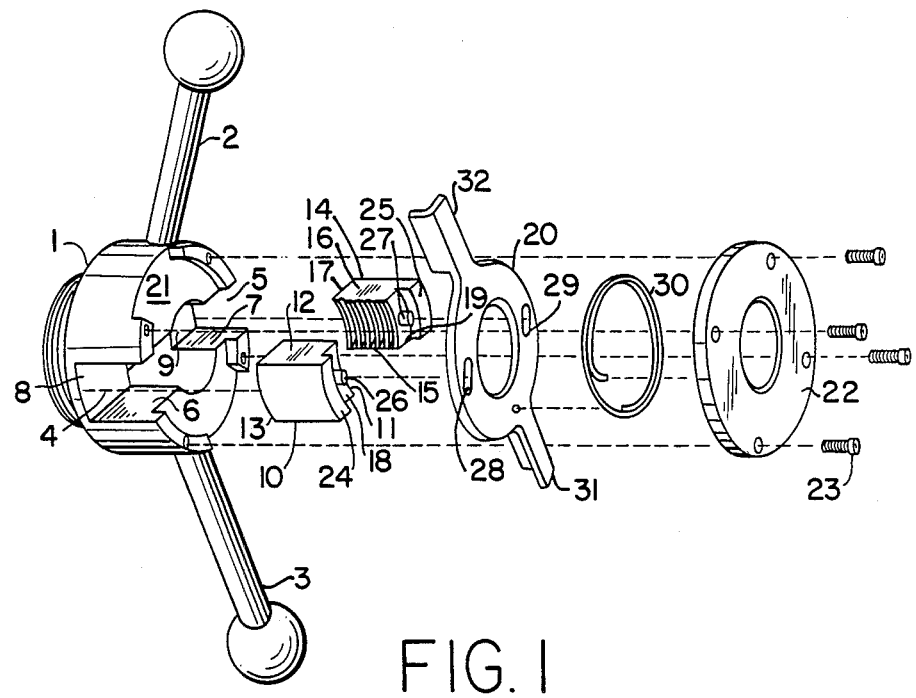
FIG. 1 is an exploded perspective view of a high-speed lock nut constructed in accordance with the invention, having two threaded segments, which move in parallel.

The high-speed lock nut depicted in FIG. 1 has a body 1, on which two handles 2 and 3 for tightening the high-speed lock nuts are mounted. The handles are tilted toward the axis of the nut. Cut in the face of the body 1, are grooves 4 and 5 which lie diametrically opposed to one another, having lateral guide surfaces 6 and 7, as well as axial guide surfaces 8 and 9. A segment 10, which has internal threads 11, is positioned in a radially displaceable manner in the groove 4, so that lateral surfaces 12 of the segment 10 act in harmony with the lateral surfaces 6 of the groove and an axial frontal surface 13 of the segment 10 with the axial frontal surface 8 of the groove 4. An opposed segment 14 with internal threads 15 slides in the groove 5, with the lateral surfaces 16 of the segment 14 cooperating with the lateral surfaces 7 of the groove 5, and the axial frontal surface 17 of the segment 14 cooperating with the axial frontal surface 9 of the groove 5.

Axial front surfaces 18 and 19 of the segments 10 and 14 provide a frontal recess in which a disk 20 is positioned for rotation. There is slight clearance between the disk and recess. The disk is held from the outside by means of a cover plate 22, which is fixed to the body 1 by means of screws 23. The segments 10 and 14 have axial projections 24, 25 on either side of the recess, the depth of which is approximately equal to the thickness of the disk 20. Axial frontal surfaces 24 and 25 on the projections abut the surface of the cover plate 22. The segments 10 and 14 are secured by means of the frontal surfaces 13, 17, and 18, 24 and 19, 25 against tilting.

Short pins 26, 27 project from the axial frontal surfaces 18, 19 of the segments 10, 14. The pins extend into oblique elongated slots 28 and 29 in the disk 20 and together with the slots form a connecting means or link guide. Between the disk 20 and the cover plate 22 there is located a essentially flat helical spring 30 which, at one end is connected to the disk 20 and at the other end to the cover plate 22. The spring is prestressed in such a way that the disk 20 is biased in a counterclockwise direction so that, by means of the pins and cooperating oblique slots, the segments 10 and 14 are pressed radially inwardly to engage the threads of the shaft (not shown). Arms 31 and 32 for manually actuating the disk 20 in the direction of rotation against the force of the helical spring 30 are located on the disk 20.

In using the high-speed lock nut constructed in accordance with FIG. 1, in connection with a balancing machine for balancing vehicle wheels, a vehicle wheel with its rim is first of all pushed onto the shaft of the balancing machine, which shaft has external threads which correspond to the internal threads 11 and 15. The highspeed lock nut is then engaged with one hand on handle 2, the other on the handle 3. Force is exerted against the arm 31 by the thumb, thus urging the arm 31 clockwise into contact with the arm 3 and against the biasing force of the helical spring 30. This action causes small pins 26, 27 to slide in the grooves 28, 29 to move the segments 10, 14 radially outwardly into open position. With the segments spaced from the shaft, the high-speed lock nut can be pushed along the axis of the shaft of the balancing machine, and pressed against the rim, which comes to rest on the side which is turned away from a corresponding flange. When the high-speed lock nut has been properly positioned, the thumb is removed from the arm 31 to permit the helical spring 30 to move the disk 20 counterclockwise. The segments 10, 14 by means of the pins 26, 27, are moved radially inwardly, so that the internal threads 11, 15 engage completely with the external threads of the shaft of the balancing machine. Because of the translation of forces in the connecting link guide, the thread segments 10, 14 are simultaneously locked in the closed position, since, under these conditions, the connecting link guide is self-locking. Subsequently, the high-speed lock nut is, by means of both handles 2 and 3 finally tightened. The loosening of the high-speed lock nut takes place analogously in the reverse sequence.

Figure 2:
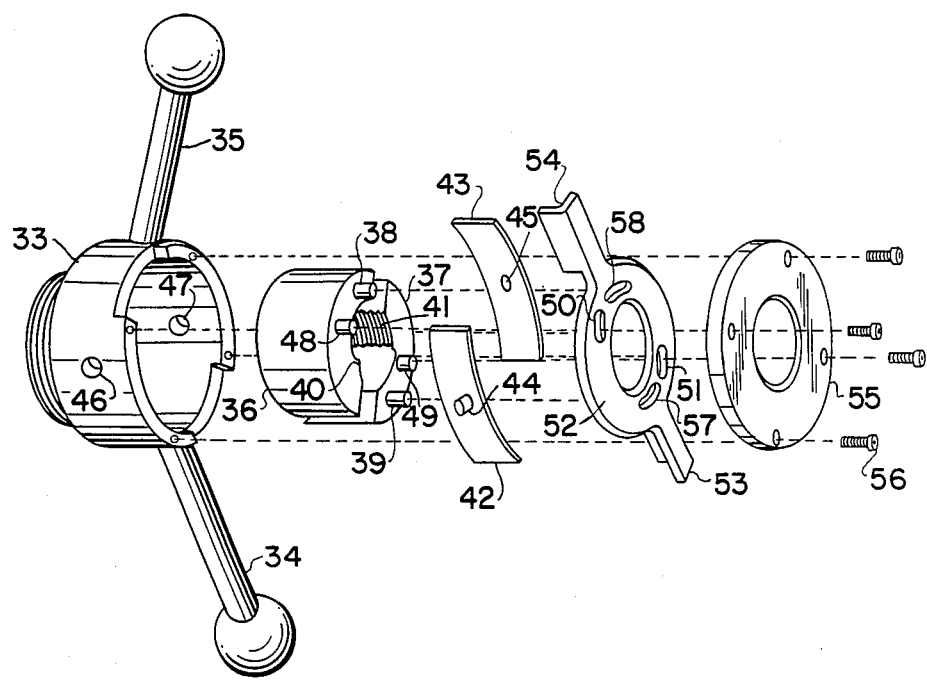
FIG. 2 is a similar view of a modification of the invention in which two threaded segments move in a swivelled manner.

In the form of the invention depicted in FIG. 2, a nut body 33 is provided, on which two handles 34, 35 are located. Inside the casing or body 33 are two semiannular arms 36, 37, respectively, each positioned to pivot around pins 38, 39. Internal threads 40, 41 are located on the ends of the arms 36, 37, remote from the pins 38, 39. Flat leaf springs 42, 43 are positioned in the space between the internal circumferential wall of the body 33 and the external arms 36, 37 which flat springs are secured by pegs 44, 45 which engage in cooperative holes 46 and 47 in the body 33. The flat springs 42 and 43 press the arms 36, 37 inwardly, in order to bring the internal threads 40, 41 into contact with the threaded shaft of the balancing machine.

The arms 36, 37 in addition to pivot pins 38, 39, have actuating pins 48, 49, which engage oblique slots 50 and 51 in disk 52. Positioned on the disk 52 are arms 53, 54 for turning. The nut body 33 is closed by means of a cover plate 55, which is attached by screws 56. In the side of the cover plate 55, not visible in the drawing, there are positioned small blind holes for supporting the ends of the actuating pins 38, 39 which extend through slots 57, 58 in the disk 52. The slots extend in the circumferential direction, so that the disk 52, in its rotational movement, is not impaired by the pins 38, 39. The pivot pins 38, 39 also project rearwardly from the end of the arms 36, 37, which projections are not visible in the drawing and are held in corresponding small blind holes, likewise not visible, in the base of the body 33.

The use of the high-speed lock nut of FIG. 2 takes place in the same way as that of FIG. 1. The only difference consists in the fact that when actuating the arm 53 to rotate the disk 52, the actuating pins 48, 49 are moved radially outwardly, and thus the arms 36, 37 pivot around the pins 38, 39 against the force of the flat springs 42, 43 in contact with the arms. When the arm 53 is released, the flat springs 42, 43 press the arms 36, 37 inwardly so that the internal threads 40, 41 enter the contact position. By means of the connecting link guide, which is formed by the actuating pins 48 and 49 and cooperating slots 50, 51 the disk 52 is rotated by the force of the springs to closed position. Separation of the arms 36, 37 is not possible because of the automatic locking of the said connecting link guide. Therefore, the high-speed lock nut is locked in the clamping position.

What is claimed is:

1. A high speed lock nut, especially for attaching a vehicle wheel to a threaded clamping shaft of a balancing machine, comprising a pair of threaded segments radially slideable within the body of the nut normally biased to engage the threads of said clamping shaft, a rotatable disk coaxial with said nut adjacent said segments, a pair of elongated oblique slots through said disk, a pin projecting from the face of each of said segments extending into said respective slots, and a cover plate over said disk fixed to the body of said nut, the improvement comprising spring means disposed between said rotatable disk and said fixed cover plate said spring means normally being in tension to bias said rotatable disk and thus the threaded segments through said pins and said cooperating slots to cause the threads of the segment to engage the threads of the clamping shaft, a disk-rotating arm extending radially from said rotatable disk to permit rotating said disk against the force of said spring to disengage said segments from said threaded clamping shaft, and at least one handle extending radially from the body of the nut, which handle is engaged by said disk-rotating arm during rotation to move said disk against said biasing force.

2. The lock nut of claim 1 in which said spring means is a helical spring disposed between said disk and said cover plate with one end secured to the disk and the other end to the cover plate.

3. In a high speed lock nut, especially for attaching a vehicle wheel to a threaded clamping shaft of a balancing machine, comprising a pair of threaded segments pivotally mounted for radial movement within the body of said nut and normally biased to engage the threads of said clamping shaft, a rotatable disk coaxial with said nut adjacent said segments, a pair of elongated oblique slots through said disk, a pin projecting from the face of each of said segments extending into said respective slots, and a cover plate over said disk fixed to the body of said nut, the improvement comprising curved flat spring means interposed between said segments and said nut body to bias said segments radially toward the axis of said nut and engage the threads of the segments with the threads of the clamping shaft, a disk rotating arm extending radially from said rotatable disk to permit rotating said disk against the biasing force of said springs to disengage the segments from said threaded clamping shaft, and at least one handle extending radially from the body of the nut, which handle is engaged by said disk-rotating arm during rotation to move said disk against said biasing force.

* * * * *